Oct. 25, 1932.　　　I. H. M. BLOCH　　　1,884,968
COMBINED FLASH LIGHT AND READING GLASS
Filed Jan. 12, 1931　　3 Sheets-Sheet 1
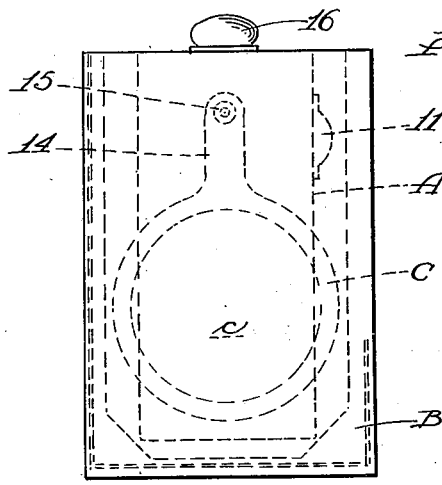
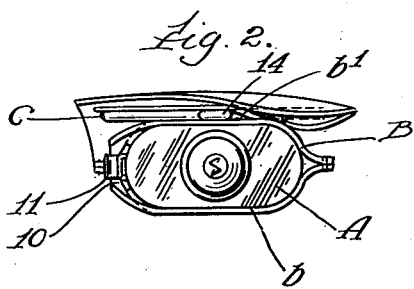
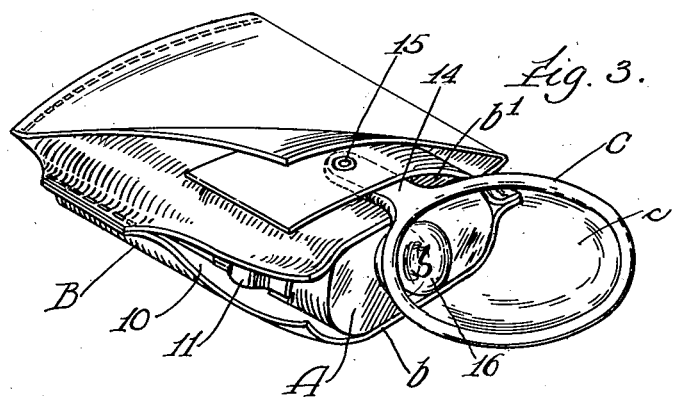
Inventor.
Isabelle H M Bloch.
by Burton + Burton
her Attorneys.
Witness
H. C. McKnight.

Oct. 25, 1932.  I. H. M. BLOCH  1,884,968
COMBINED FLASH LIGHT AND READING GLASS
Filed Jan. 12, 1931  3 Sheets-Sheet 2
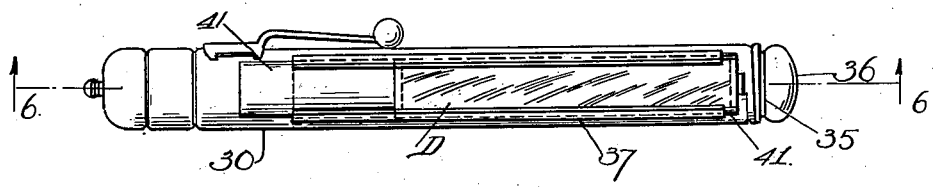
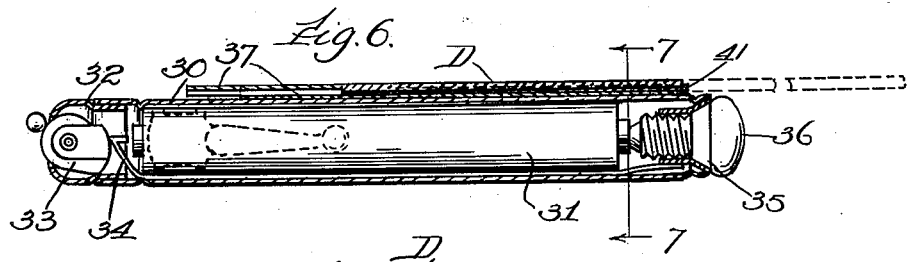
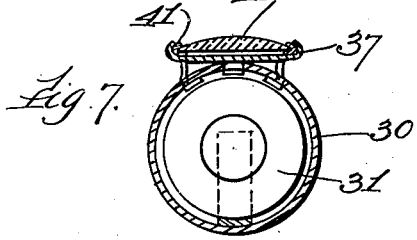
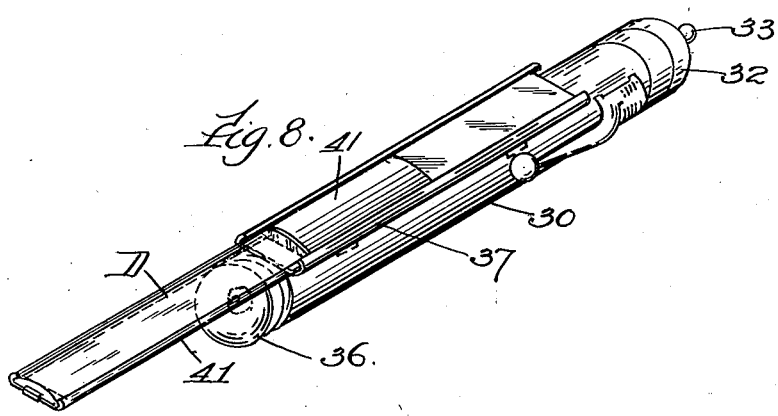
Inventor.
Isabelle H M Bloch.
by Burton & Burton
her Attorneys.

Oct. 25, 1932.　　　I. H. M. BLOCH　　　1,884,968
COMBINED FLASH LIGHT AND READING GLASS
Filed Jan. 12, 1931　　3 Sheets-Sheet 3
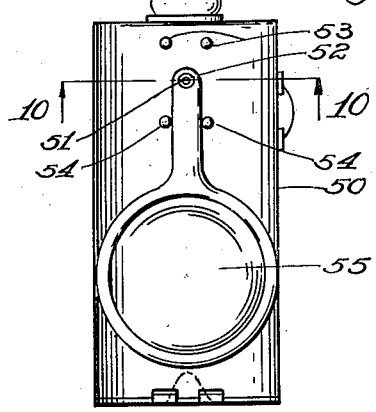
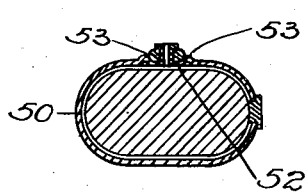
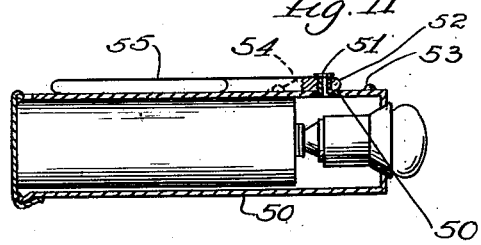
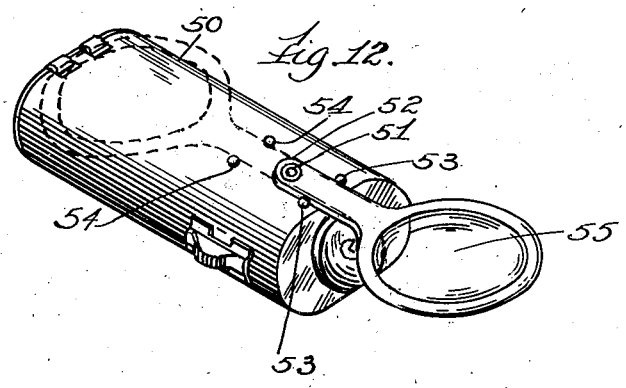
Inventor:
Isabelle H M Bloch,
by Burton Burton
her Attorneys.
Witness
N F McKnight Patented Oct. 25, 1932

1,884,968

UNITED STATES PATENT OFFICE

ISABELLE H. M. BLOCH, OF CHICAGO, ILLINOIS

COMBINED FLASH LIGHT AND READING GLASS

Application filed January 12, 1931. Serial No. 508,159.

The purpose of this invention is to provide in a unitary construction an electric flashlight and a reading glass adapted for illuminating by the light the matter over which the reading glass may be held for magnifying it while thus illuminated. It consists in the elements and features of construction shown and described as indicated in the claims.

In the drawings:

Figure 1 is a side elevation of a device embodying this invention in one of its forms.

Figure 2 is a front end elevation of the same.

Figure 3 is a perspective view of the same showing the casing partly open to disclose details of interior structure.

Figure 4 is a detail section at the line 4—4 on Figure 3.

Figure 5 is a side elevation of another form of the invention.

Figure 6 is a section at the line 6—6 on Figure 5.

Figure 7 is a section at the line 7—7 on Figure 6.

Figure 8 is a perspective view of the device with the reading glass extended in position for magnifying the matter illuminated by the light.

Figure 9 is a side elevation of a third form of the invention.

Figure 10 is a section at the line 10—10 on Figure 9.

Figure 11 is a section of the casing at the line 11—11 on Figure 9 showing the dry cell and the lamp in side elevation.

Figure 12 is a perspective view of the device in this form with the reading glass extended in a position for magnifying the matter on the area illuminated by the lamp.

Referring to the form shown in Figures 1 to 4: At A there is shown in entirety a flashlight of familiar form and construction which is telescopingly inserted in an open-ended pocket or cell, $b$, of the casing, B, which is preferably made of flexible material as leather or the like, so as to receive the parts which are to be held in relation to each other, snugly, without requiring mechanical engagement for retaining them in assembled relation, except as hereinafter indicated; but it should be understood that the invention is not limited to the employment of such flexible material for the casing, and on the contrary, such casing may be rigid except as to the folded flaps hereinafter mentioned.

The case, B, has an opening at one lateral edge, as seen at 10 for affording access to the customary switch-operating slide, 11, of the flashlight.

Beside the pocket or cell which accommodates the flashlight unit, the case, B, has a pocket or cell, $b^1$, alongside the cell, $b$, for accommodating a reading glass, C, which may be understood to be of familiar form and character, comprising a handle, 14, by which it is pivotally secured to the casing, A, as by an eyelet seen at 15, for swinging into and out of the cell, $b^1$, said pivot being at suitable position to permit the lens, $c$, of the reading glass to swing out to a position overhanging the light beam directed from the lens, 16, of the flashlight, the reading glass being designed to extend in a plane parallel to the axis of the lens, 16, of the flashlight when it is swung out of the case, A, to the position indicated.

The case A, may be made with the outer side of the pocket, $b^1$, formed as a flexible flap which may be flexed outwardly for convenience of manipulating the reading glass in swinging it in and out of its cell.

In the form shown in Figures 5, 6, 7 and 8, the device is made in the form of a slender tube, as of a pocket fountain pen or pencil, the tubular case, 30, serving for receiving a dry cell, 31, arranged to be entered at one end of the tube and retained by a cap, 32, which carries a manually operable cam for operating the switch, 34, by which the circuit connection of the dry cell with the lamp bulb is controlled; and the opposite end of the tube is arranged for holding and stopping in proper position the lamp bulbs, 35, and the beam-directing lens, 36.

The construction as thus far described it will be recognized is similar, in general, to familiar constructions of vest pocket flashlights except as to dimensions and form and location of the controlling switch.

The tubular casing, 30, is exteriorly formed at one side with a slideway, 37, for retaining and guiding the enclosing frame, 41, of an oblong reading glass, D, said frame being extended at the inner end beyond the length of the glass to afford a mounting portion which may remain slidingly engaged with the guideway, 37, when the lens of the reading glass is thrust out to reading position parallel to and overhanging the light beam projected from the beam-projecting lens of the flashlight.

In the form illustrated in Figures 9, 10, 11 and 12, the flashlight unit is in the familiar form which is shown in Figures 5, 6 and 7, and is arranged with respect to the reading glass so as to dispense with the casing, A, of the form shown in Figures 1 to 4, inclusive, by mounting the reading glass of the form shown in Figures 1 to 4 hingedly on the side of the flashlight body, 50, as by a pivot, 51, positioned at such distance from the opposite ends respectively of said body that the reading glass, 55, may be adjusted about the pivot to out-of-use position as seen in dotted line in Figure 8, lapping on the side of the body and not projecting any substantial distance beyond the handle end of the body; and so that when swung around 180 degrees to the opposite end, the reading glass will extend beyond the light end of the body into proper position for reading the illuminated area.

The body, 50, may be formed with slight outwardly struck bosses, 53, 53, at opposite sides of the pivot of the reading glass, over which bosses the stem, 52, of the reading glass snaps and between which it becomes engaged when it is swung from out-of-use position at which it is seen in dotted line in Figure 12, to position for use shown in full line. A like pair of bosses, 54, 54 may be provided at the rear side of the pivot for engaging the reading glass rim and holding its glass at out-of-use position.

I claim:

1. In combination with an electric flashlight comprising a tubular casing for an energizing dry cell and a lamp bulb and beam-directing means mounted in one end of said casing, an oblong reading glass having its width approximately equal to the diameter of the tubular casing, the casing having at one side a guideway for the reading glass, the latter being arranged for sliding in said guideway from a position alongside the tubular casing to a position lateral with respect to the flashlight beam.

2. The construction defined in Claim 1, the tubular casing having at the end opposite that at which the lamp bulb is mounted a manually operable switch for controlling the illumination of the lamp.

In testimony whereof, I have hereunto set my hand at Chicago, Ill., this 6th day of January, 1931.

ISABELLE H. M. BLOCH.